Aug. 28, 1962
F. D. HENDERSON
3,050,996
SPEED RESPONSIVE DEVICES
Filed June 13, 1955
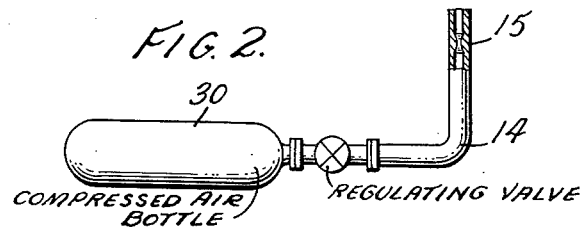
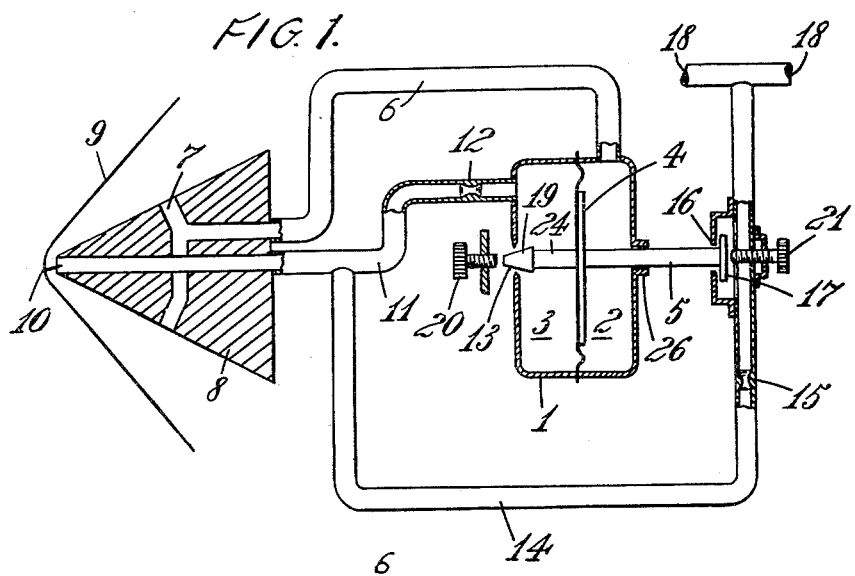
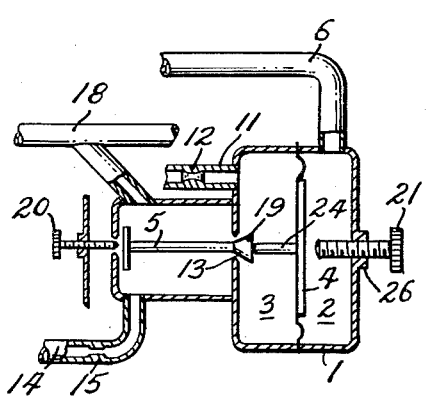
INVENTOR
F. D. HENDERSON
By Wilkinson & Mawhinney

United States Patent Office 3,050,996
Patented Aug. 28, 1962

3,050,996
SPEED RESPONSIVE DEVICES
Frank Dryburgh Henderson, Bristol, England, assignor, by mesne assignments, to Bristol Siddeley Engines Limited, Bristol, England, a British company
Filed June 13, 1955, Ser. No. 514,802
Claims priority, application Great Britain June 14, 1954
7 Claims. (Cl. 73—182)

This invention relates to devices for indicating Mach number or for effecting a control action when the relative rate of movement of a body carrying the device and a fluid contacting the body reaches a predetermined Mach number in excess of unity. Such devices as applied to effecting a control action are used, for example, for controlling the flow of fuel supplied to the combustion chambers of ram-jet engines driving aerial vehicles so as to maintain the vehicles in flight at a predetermined Mach number.

A known device for effecting a control action at a particular Mach number comprises a container divided into two compartments by a substantially rateless flexible diaphragm associated with control action transmission means. One compartment is connected by a conduit to a port in the conical surface of a cone having its apex facing the direction of relative approach of the fluid, and the other compartment is maintained at a pressure which is a fixed fraction of the absolute pressure generated in an unshielded forwardly facing port in the apex of the cone, the said fraction being predetermined so that the pressures in the two compartments are equal at the Mach number at which the control action is required to take place.

Such a device operates on the "all or nothing" principle, and if applied to the control of a moving body or fluid, will produce a system which hunts on either side of the change-over Mach number owing to the inertia of the controlled masses. By introducing a damping device between the diaphragm and the control transmission and by increasing the inertia of the latter it is possible to cause the hunting to die away, but it will recommence if the system is disturbed by a change in the external conditions.

To avoid such hunting it has been proposed to bias the diaphragm by means of a spring. The device then operates progressively over a range of Mach numbers dependent upon the rate of the spring. Such a device can be arranged to operate satisfactorily within a permissible tolerance in the control Mach number provided the density of the fluid contacting the body carrying the device remains substantially constant, but if this density varies, as for example with changes of altitude in the case of an aerial vehicle, the pressure differentials upon the diaphragm change with it, but the forces produced by the spring remain the same, so that the range of Mach numbers over which the device operates changes.

The object of the present invention is to provide a device of the general character already described which will operate progressively over a selected range of Mach numbers independently of changes in the density of the fluid contacting the body carrying the device. The fact that the device will respond to a range of Mach numbers also makes it possible to use the device as a Mach number indicator.

According to the invention there is provided a device for producing movement of a member, which device is progressively responsive to the attainment between a body carrying the device and a fluid contacting the body of relative rates of movement within a desired range of Mach numbers exceeding unity in order to move said member, upon change of Mach number within said desired range, to a unique position for each Mach number within said desired range, said device being of the kind comprising a container divided in a pressure-tight manner into two compartments by a wall which is freely movable with respect to the container to reduce the volume of one of the compartments and increase the volume of the other of the compartments and vice versa, said wall constituting said member, a first conduit or duct for communicating one of said compartments with a port, in a surface over which the fluid stream flows in operation and inclined to the direction of relative approach of said fluid, said surface terminating upstream of said port in such manner that in operation of the device a shock wave will form in advance of the port, and a second conduit or duct to provide at least part of a connection between an unshielded forwarding facing port and the other of said compartments; which device is characterised by adjustable pressure proportioning means for obtaining in the other of said compartments a fluid pressure which, in operation of the device, is a fraction of the absolute fluid pressure generated in said unshielded forwardly facing port, and in that the device comprises adjusting means responsive to movement of said movable wall with respect to said container for progressively adjusting said pressure proportioning means so that at each relative rate of movement within said desired range of Mach numbers equal pressures will be produced in said compartments at a unique relative position between said movable wall and said container.

A device as just defined may further comprise signalling means including means for indicating changes in the position of the movable wall relatively to the container the indicating means being calibrated to indicate Mach numbers or a quantity proportional thereto. Alternatively, or in addition, the device may further comprise signalling means responsive to movements of the movable wall relatively to the container and operable to bring about a control action.

Devices in accordance with the present invention will now be specifically described, merely by way of example, with reference to the accompanying drawings in which:
FIGURE 1 shows a device according to the invention including operating means responsive to movements of the movable wall of the device relatively to the container to bring about a control action, and FIGURES 2 and 3 show modifications of the device illustrated in FIG. 1.

The device shown in FIGURE 1 is intended for controlling the fuel system of a ram-jet engine driving an aerial vehicle, the fuel system being arranged in known manner to control the flow of fuel in direct proportion to the absolute ram air pressure picked up by a forwarding facing orifice. The device comprises a container 1 divided in a pressure-tight manner into two compartments 2 and 3 by a wall in the form of a freely movable diaphragm 4 to which is attached a control action transmission rod 5. The diaphragm 4 is movable to reduce the volume of compartment 2 and increase the volume of compartment 3 and vice versa. A conduit 6 leads from the compartment 2 to a port 7 in the flanking surface of a cone 8 which is exposed to the relative air stream so that during flight of the aerial vehicle air flows over the flanking surface of the cone, the cone having its apex facing the oncoming air. In operation, at speeds above Mach 1 a conical shock wave 9 is formed from the apex of the cone, so that the port 7 is always behind the shock wave. An unshielded forwardly facing port 10 is also provided in the apex of the cone and is connected by a conduit 11 to a pressure proportioning means comprising an upstream restriction 12 and a downstream restriction 13. When, with such a device, the pressure drop across the downstream restriction 13 is supercritical, the flow through the restrictions is independent of the pressure downstream of the downstream restriction and the pressure between the restrictions is a fraction of the absolute pressure upstream of the upstream restriction, the value of the fraction depending only on the relative areas of the two restrictions. It is arranged that the said pressure between the restrictions acts in the compartment 3 upon the diaphragm 4, the compartment 3 communicating with the space between the restrictions 12 and 13 and in the present example, actually constituting this space, and since at each Mach number above unity there exists a fixed relation between the pressures produced in the ports 7 and 10, that in the latter being the greater, it is possible by suitable selection of the areas of the restrictions 12 and 13 to have equal pressures on opposite sides of the diaphragm 4 at any desired Mach number above unity.

In a known arrangement of this kind the restrictions 12 and 13 are made of appropriate fixed areas so that equilibrium of the diaphragm occurs at a predetermined Mach number. If the relative speed exceeds that corresponding to the equilibrium Mach number the pressure in the compartment 3 will rise above that in the compartment 2 so that the diaphragm 4 will move towards the right in the drawing until stopped by external means. Similarly, if the relative speed falls below that corresponding to the equilibrium Mach number the pressure in compartment 2 will rise above that in compartment 3 so that the diaphragm 4 will move to the left until stopped by external means. Such movements may be used to effect control operations such as varying the air-fuel ratio of the ram jet engine so as to decrease or increase its thrust and cause a deviation in speed back towards the desired Mach number.

In view of the fact that the diaphragm only has three positions however, and because of the inertia of the vehicle, the control transmission actuated by movement of the diaphragm and the mechanism of the air/fuel ratio controller, all of which make it impossible for the speed of the vehicle to be changed instantaneously as the equilibrium position is passed through, the device hunts above and below the desired value.

To overcome this objection, it has been proposed to bias the diaphragm 4 by means of a spring so that it is progressively displaced as the speed passes through a range of Mach numbers and a corresponding progressive adjustment is applied to the fuel system tending to prevent further change of speed. Thus the system tends towards a state of balance in which the pressure differential across the diaphragm holds the fuel/air ratio adjustment at a value producing the speed corresponding to the pressure differential.

Such an arrangement has the disadvantage, however, that whereas with increase of altitude the pressure differential across the diaphragm 4 falls for a given Mach number other than the equilibrium Mach number, the strength of the spring remains the same, so that the system stabilizes at different Mach numbers at different altitudes.

According to the present invention, instead of using a spring to produce stabilization, movement of the diaphragm 4 is used to adjust the area of one of the restrictions 12 or 13. Thus in the example being described movement of the diaphragm 4 is used to adjust the area of the downstream restriction 13 which, in the present case, is in the form of an orifice or outlet in a wall of the container 1 substantially parallel with the diaphragm 4 and bounding the compartment 3. To this end the diaphragm 4 carries a rod 24 having a conical portion forming a valve member 19 and the valve member projects through the orifice, so that as the diaphragm moves towards the orifice to reduce the volume of compartment 3 the valve member moves to reduce the area of the orifice and vice versa. As the diaphragm moves therefore, the ratio of the pressure in the compartment 3 to the pressure in the port 10 is adjusted in the sense to equalise the pressures in the compartments 2 and 3. Thus for any Mach number within a range determined by the maximum and minimum permitted values of the ratio of the areas of the fixed restriction 12 and the variable restriction 13 there will correspond a unique position of the diaphragm 4 relatively to the container 1, and this may be used to produce a signal dependent upon the Mach number within the desired range for the time being persisting during operation of the device.

In the construction being described movement of the diaphragm 4 is transmitted by the rod 5 to a bleed valve 17 which adjusts the area of a bleed orifice 16 in a duct 14 branching from the duct 11 upstream of the restriction 12 and proceeding by way of two branches 18 to two pressure sensing devices (not shown) forming the control elements of fuel/air ratio controllers pertaining to two ram jet engines, the arrangement of the fuel/air ratio controllers being such as to control the fuel flow in proportion to the pressure sensed by the said elements in very well known manner. A fixed restriction 15 is provided in the duct 14 upstream of the bleed orifice 16, and in operation the pressure drop through the bleed orifice 16 is super-critical, so that a pressure is produced downstream of the restriction 15, and therefore on the sensing elements of the fuel/air ratio controllers, which is a fraction of the ram air pressure picked up by the orifice 10, the value of the fraction depending upon the ratio of the areas of the fixed restriction 15 and the bleed orifice 16.

Since the diaphragm 4 assumes a unique position for each Mach number within the range determined by the maximum and minimum permitted values of the ratio of the areas of the restrictions 12 and 13, there will be a unique adjustment of the value of the fraction of the ram air pressure which becomes operative upon the fuel/air ratio controllers for each Mach number within the control range of the device.

In a modification of the device at present being described the conduit 14 is connected to a source 30 of constant pressure instead of to the ram air inlet duct 11 as shown in FIGURE 2. The device, modified in this way can be used for the remote transmission of a pressure which varies as a function only of the displacements of the diaphragm 4, and can therefore be used to indicate Mach numbers or quantities proportional thereto and to effect a control action at a remote station.

To enable the operative range of either of these devices to be adjusted, the movement of the diaphragm is limited in the low speed direction by an adjustable abutment screw 20 and in the high speed direction by an adjustable abutment screw 21.

In operation of the device described with reference to FIGURE 1, as the vehicle accelerates, the diaphragm-valve assembly remains in contact with the abutment screw 20, and the fuel system remains in its full thrust adjustment, until a Mach number is reached at which the pressures in the compartments 2 and 3 are equal. The diaphragm valve assembly then begins to move to the right decreasing the thrust of the engine and the acceleration of the vehicle. At the same time the restriction 13 is increased in size by the movement of the valve 19 with the result that the pressure in the compartment 3 becomes a progressively smaller fraction of the pressure in the port 10. The acceleration thus progressively falls off, the pressures in the compartments 2 and 3 being always substantially equal, until the system becomes fully stabilized when the thrust has fallen to equal the drag and the acceleration becomes zero. It is arranged that such a condition of stabilization occurs before the diaphragm-valve assembly reaches the abutment screw 21, this latter serving as an emergency weak limit stop to prevent the air/fuel ratio being increased beyond the possible working range.

Since a single port 7 in the flank of the cone 8 would be subject to varying pressures in the event of yawing movements of the vehicle, a number of such ports are provided around the cone, interconnected as shown, so that the mean of the pressures at the ports 7 is transmitted to the compartment 2.

As described, the rods 24 and 5 are attached to opposite sides of the diaphragm 4, and the rod 5, in this case passes to the outside of the container 1 through sealing means 26 in a wall of the compartment 2 of the container.

Instead of the control rod 5 passing through the wall of the compartment 2, however, it may be formed as an extension of the rod 24 so as to avoid the need for the sealing means, the rod in this case passing to the outside of the container through the orifice constituting the variable restriction 13 as shown in FIGURE 3.

I claim:

1. A device comprising a hollow container divided into first and second chambers by a movable wall, first conduit means conveying pressure to the first chamber, second conduit means conveying pressure from said first chamber, third conduit means conveying pressure to the second chamber, a first fixed restriction in the first conduit means, a first variable restriction in the second conduit means, first transmission means connected between said movable wall and said first variable restriction to vary the latter, auxiliary duct means connected to a source of pressure fluid at a control pressure and leading to a pressure sensing means, a second fixed restriction in said auxiliary duct means, a variable bleed orifice in said auxiliary duct means, and second transmission means connected between said movable wall and said variable bleed orifice to vary the latter.

2. A device as claimed in claim 1 wherein the auxiliary duct means is connected to said first conduit means upstream of said fixed restriction.

3. A vehicle capable of movement at supersonic speeds comprising a device as claimed in claim 1, a conical surface so located on the vehicle that a shock wave will be generated at the apex of said surface when the vehicle is moving at supersonic speeds; an unshielded forwardly facing first part at the apex of said conical surface, said forwardly facing first part being connected to said first conduit means; and a second part in said conical surface located so that in operation the shock wave will form upstream thereof, said second part being connected to said third conduit means.

4. A device comprising a hollow container, a movable wall serving to divide the container into a first chamber and a second chamber, a first duct for conveying pressure fluid to the first chamber, a first restriction in said first duct, the first chamber having an outlet and a second restriction in said outlet, one of said restrictions comprising a first movable member connected to the movable wall to move therewith and to vary the area of that restriction, a second duct for transmitting a pressure to the second chamber, a third duct connected to a source of pressure fluid at a control pressure, a third restriction in said third duct, an outlet from said third duct disposed downstream of the third restriction, and a fourth restriction controlling said outlet, one of which restrictions in said third duct comprises a second movable member connected to said movable wall to move therewith and to vary the area of that restriction, and a conduit connection between said third and fourth restrictions leading to a pressure sensing means.

5. A device as claimed in claim 4, which the fourth restriction is the variable area restriction in the third duct, and wherein said source of pressure fluid is at a constant pressure sufficient to maintain a super-critical pressure drop across the fourth restriction whereby the pressure of fluid in said duct on the downstream side of the third restriction is a fraction of the pressure on the upstream side of the third restriction which fraction is determined only by the position of said movable wall relative to said container.

6. A device as claimed in claim 4, wherein the restriction in the outlet from the first chamber is the restriction controlled by the first movable member and said first restriction is a fixed restriction.

7. A device as claimed in claim 4, wherein the second restriction is the variable-area restriction in the first duct and the fourth restriction is the variable-area restriction in the second duct, the first and third restrictions being of fixed area, and wherein the first and second movable members are mounted on opposite sides of the movable wall to each other to move with the movable wall, movement of the wall in one direction serving to reduce the areas of the second and fourth restrictions and movement of the wall in other direction serving to increase the areas of the second and fourth restrictions.

References Cited in the file of this patent

UNITED STATES PATENTS

| 297,878 | Baroni | May 4, 1943 |
| 2,645,240 | Drake | July 14, 1953 |
| 2,662,402 | Ince | Dec. 15, 1953 |
| 2,749,749 | Billman et al. | June 12, 1956 |
| 2,767,579 | Faget | Oct. 23, 1956 |
| 2,767,725 | Long | Oct. 23, 1956 |

FOREIGN PATENTS

| 90,639 | Sweden | Oct. 26, 1937 |
| 745,838 | Germany | Nov. 30, 1944 |
| 700,441 | Great Britain | Dec. 2, 1953 |

OTHER REFERENCES

Considerations Entering into the Selection of Probes for Pressure Measurement, etc. by Gettelman and Krause, Instruments Magazine, Sept. 1953.